US009849609B2

(12) United States Patent
Merli et al.

(10) Patent No.: US 9,849,609 B2
(45) Date of Patent: Dec. 26, 2017

(54) MOLD FOR BUILDING COATING PRODUCTS AND PLANT FOR MANUFACTURING SUCH COATING PRODUCTS

(71) Applicant: VH S.R.L., Fossalta di Copparo (Fe) (IT)

(72) Inventors: Vittorio Merli, Ferrara (IT); Adriano Savorelli, Ferrara (IT)

(73) Assignee: VH S.R.L., Fossalta di Copparo (FE) (IT)

(*) Notice: Subject to any disclaimer, the term of this patent is extended or adjusted under 35 U.S.C. 154(b) by 124 days.

(21) Appl. No.: 15/032,921

(22) PCT Filed: Dec. 1, 2014

(86) PCT No.: PCT/IB2014/066473
§ 371 (c)(1),
(2) Date: Apr. 28, 2016

(87) PCT Pub. No.: WO2015/083058
PCT Pub. Date: Jun. 11, 2015

(65) Prior Publication Data

US 2016/0250772 A1 Sep. 1, 2016

(30) Foreign Application Priority Data

Dec. 2, 2013 (IT) ................................ MI2013A2011

(51) Int. Cl.
*B28B 7/06* (2006.01)
*B28B 7/28* (2006.01)
(Continued)

(52) U.S. Cl.
CPC .............. *B28B 7/348* (2013.01); *B28B 7/007* (2013.01); *B28B 7/24* (2013.01); *B28B 7/36* (2013.01); *B28B 7/388* (2013.01)

(58) Field of Classification Search
USPC ..... 264/39, 239, 297.1, 297.6, 297.8, 297.9, 264/299, 300, 334, 336, 337
See application file for complete search history.

(56) References Cited

U.S. PATENT DOCUMENTS 4,078,760 A * 3/1978 Mullins ................. B28B 7/0055 249/119
4,151,976 A * 5/1979 Schurman ............... B29C 49/48 249/102
(Continued)

FOREIGN PATENT DOCUMENTS

| | | | |
|---|---|---|---|
| CA | 2350370 | A1 | 9/2002 |
| CN | 2546170 | Y | 4/2003 |

(Continued)

OTHER PUBLICATIONS

Chinese Office Action, 201480064535.3, dated Mar. 24, 2017.
(Continued)

*Primary Examiner* — Sing P Chan
(74) *Attorney, Agent, or Firm* — Lucas & Mercanti, LLP

(57) ABSTRACT

A mold for building coating products obtained from composite liquid mixtures is described. The mold includes a base plate, having a plurality of through holes; and a die, configured for incorporating the base plate therein. On the upper surface of the die there are a plurality of shapes of the front surface in negative of each coating product to be manufactured and a molding grid open at the upper part, configured to be pressure applied above the die. The molding grid has side walls which define the perimeter edges of each coating product. Between the molding grid side walls separate bowls are formed for containing a single coating product. Each side wall is inclined at an acute angle with respect to a vertical plane, to confer to each side wall a sharp-pointed and tapered shape from top towards bottom with respect to the
(Continued)

entire mold for facilitating the extraction of the finished coating products.

16 Claims, 9 Drawing Sheets

(51) Int. Cl.

| | |
|---|---|
| ***B28B 7/34*** | (2006.01) |
| ***B28B 5/00*** | (2006.01) |
| ***B28B 1/14*** | (2006.01) |
| ***B28B 13/06*** | (2006.01) |
| ***B29C 39/02*** | (2006.01) |
| ***B29C 39/22*** | (2006.01) |
| ***B29C 39/36*** | (2006.01) |
| ***B29C 41/02*** | (2006.01) |
| ***B29C 41/38*** | (2006.01) |
| ***B29C 41/42*** | (2006.01) |
| ***B28B 7/00*** | (2006.01) |
| ***B28B 7/24*** | (2006.01) |
| ***B28B 7/36*** | (2006.01) |
| ***B28B 7/38*** | (2006.01) |

(56) References Cited

U.S. PATENT DOCUMENTS 4,330,256 A * 5/1982 Reichenbach ...... B29C 37/0003 264/334
4,379,687 A * 4/1983 Wilson .................. B29C 33/306 249/103
4,386,047 A * 5/1983 Reichenbach ...... B29C 37/0003 264/328.8
4,535,965 A * 8/1985 Dettelbach ......... B24D 18/0009 249/122
4,865,794 A * 9/1989 Nakajima ............... B29C 45/14 249/52
4,972,909 A * 11/1990 Rose ......................... A01L 5/00 168/4
6,394,779 B1 * 5/2002 Komazawa ....... B29C 45/14418 264/262
2002/0001634 A1 * 1/2002 Komazawa ....... B29C 45/14491 425/123
2003/0150586 A1 * 8/2003 Matsuura ............... B22D 17/22 164/137
2007/0111578 A1 * 5/2007 Langon .................. H01R 12/52 439/300
2008/0088063 A1 4/2008 Irvin
2010/0223869 A1 9/2010 Smith et al.
2014/0070457 A1 * 3/2014 Foster ................... B28B 11/243 264/319
2015/0359234 A1 * 12/2015 Meulendijks ........ A22C 7/0084 425/362
2016/0250772 A1 * 9/2016 Merli ...................... B28B 7/007 264/39
2016/0250814 A1 * 9/2016 Sugiyama ............. B29D 30/12 264/326

FOREIGN PATENT DOCUMENTS

| | | | |
|---|---|---|---|
| CN | 102259380 | A | 11/2011 |
| CN | 103831892 | A | 6/2014 |
| DE | 102005016212 | A1 | 11/2006 |
| EP | 2363262 | A1 | 9/2011 |
| WO | 9925933 | A1 | 5/1999 |
| WO | 2004062866 | A1 | 7/2004 |
| WO | 2010069057 | A1 | 6/2010 |

OTHER PUBLICATIONS

International Search Report and Written Opinion for International Application No. PCT/IB2014/066473. (dated Apr. 23, 2015) (14 Pages).

* cited by examiner

MOLD FOR BUILDING COATING PRODUCTS AND PLANT FOR MANUFACTURING SUCH COATING PRODUCTS

CROSS-REFERENCE TO RELATED APPLICATIONS

This application is a 371 of PCT/M2014/066473, filed Dec. 1, 2014, which claims the benefit of Italian Patent Application No. MI2013A002011, filed Dec. 2, 2013.

FIELD OF THE INVENTION

The present invention refers to a mould for building coating products, as well as to a plant for manufacturing such coating products.

BACKGROUND OF THE INVENTION

The coating products for walls made up of artificial stones are currently obtained by pouring various very liquid mixtures, usually consisting of inerts (sand), water, cement, additives, colouring, plasticisers, etc., in suitable moulds. The moulds are typically manufactured with polyurethane rubber or with similar materials, as illustrated for example in document WO 2004/062866 A1. The moulds are generally obtained by covering some sample natural stones with the polyurethane rubber, thus obtaining a concave die inside of which the mixture which reproduces the natural stone is poured. With the subsequent hardening of the mixture the finished product is obtained, completely similar to the original stone.

The polyurethane rubber of the moulds, in addition to the fact of perfectly copying the sample to be reproduced, also has the capability of easily detaching from the finished product, obtained from the mixture poured inside of the mould. This is due to the high elastic deformability of the mould, which thus makes it possible to easily free the finished product also in the case of possible undercuts present in the product itself.

The unmoulding is essentially a manual operation and, consequently, it is very expensive. In addition, the capability of easily unmoulding the finished product becomes a negative aspect over time, since the mould loses elasticity and tends to break and/or deform with use, to the point of not being able to be used any longer. Indeed the pieces produced with the broken or deformed mould become incompatible with one another, generating assembly difficulties, since various pieces are no longer capable of coupling with one another in the foreseen manner. The high labour cost for unmoulding and for packing the finished products, to which also the cost of replacing the moulds, which is also high, is added thus leading to a production cost that is substantial for conventional manufacturing plants of artificial stones.

The finished product, generally of the slab-like type, matches the mould both in its lower surface, that is exposed in the coated wall, and its peripheral surface, which has a positive unmoulding surface (see FIGS. 1-3). For such a reason the peripheral or lateral walls A, B, C and D of the product 100, once the latter has been installed, have a peripheral furrow that must be filled with sealing agent and that is clearly visible, with a debatable aesthetic effect. In some cases it is not acceptable for the end buyer, also because it further increases the installation cost.

At the state of the art numerous moulds and relative processes are known for obtaining slab-like products, in particular artificial stones for decorative use, like for example those described in documents WO 2010/069057 A1, EP 2 363 262 A1, WO 99/25933 A1 and US 2008/088063 A1. These documents, however, describe moulds and processes for producing objects that are obtained starting from dry-cast concrete pressed inside metal formworks. On the contrary, the present invention concerns a mould and a plant for the production of stone veneer that is obtained by pouring liquid cement mortar inside the formworks or dies made of polyurethane rubber with high deformability, so as to allow the end product to be subsequently unmoulded.

In the procedures known for obtaining artificial stones starting from liquid mortar or mixtures, the end product is obtained by pouring such liquid mortar or mixtures inside formworks copying the negative of natural stones, made up for example of rocks also with substantial undercuts. At the state of the art the material making up the formwork is flexible and very deformable to such an extent that it is easy to extract the product after it has hardened. This, however, leads to the drawback of wearing and deforming the formwork itself after repeated use. After a certain number of production cycles the formwork becomes useless due to permanent deformation and wearing, which make it necessary for it to be replaced.

SUMMARY OF THE INVENTION

The purpose of the present invention is therefore that of making a mould for building coating products, as well as a plant for manufacturing such coating products, which are capable of solving the aforementioned drawbacks mentioned in the prior art in an extremely simple, cost-effective and particularly functional manner.

In detail, one purpose of the present invention is that of making a mould for building coating products that is particularly durable, i.e. capable of manufacturing a considerable amount of products without becoming deformed.

Another purpose of the present invention is that of making a mould for building coating products that is capable of manufacturing such products in a precise manner, so as to ensure a perfect coupling in the subsequent installation steps.

A further purpose of the present invention is that of making a plant for manufacturing coating products for construction that is completely automated.

These purposes according to the present invention are achieved by making a mould for building coating products, as well as a plant for manufacturing such coating products, as outlined in the independent claims.

Further characteristics of the invention are highlighted in the dependent claims, which are an integrating part of the present description.

The mould for building coating products according to the present invention is of the type "with reverse demoulding" and it consists of three main parts that are described in the rest of the description. The three parts are interconnected with one another so as to allow the production of coating stones while avoiding the production and economic drawbacks that were previously described. In addition, the mould for building coating products "with reverse demoulding" according to the present invention also makes it possible to automate the industrial production process of the products themselves.

BRIEF DESCRIPTION OF THE DRAWINGS

The characteristics and the advantages of a mould for building coating products and of a plant for manufacturing such coating products according to the present invention shall become clearer from the following description, given as an example and not for limiting purposes, with reference to the attached schematic drawings, in which.

DETAILED DESCRIPTION OF THE INVENTION

Figure 2:
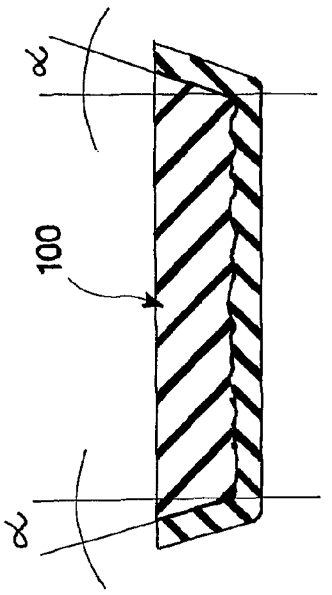
Fig.2 PRIOR ART
FIG. 2 is a vertical section view of the mould of FIG. 1.
Figure 3:
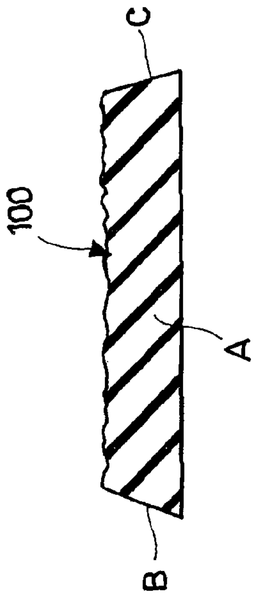
Fig.3 PRIOR ART
FIG. 3 is a side elevational view of a coating product, typically an artificial stone, manufactured with the mould of FIG. 1.
Figure 1:
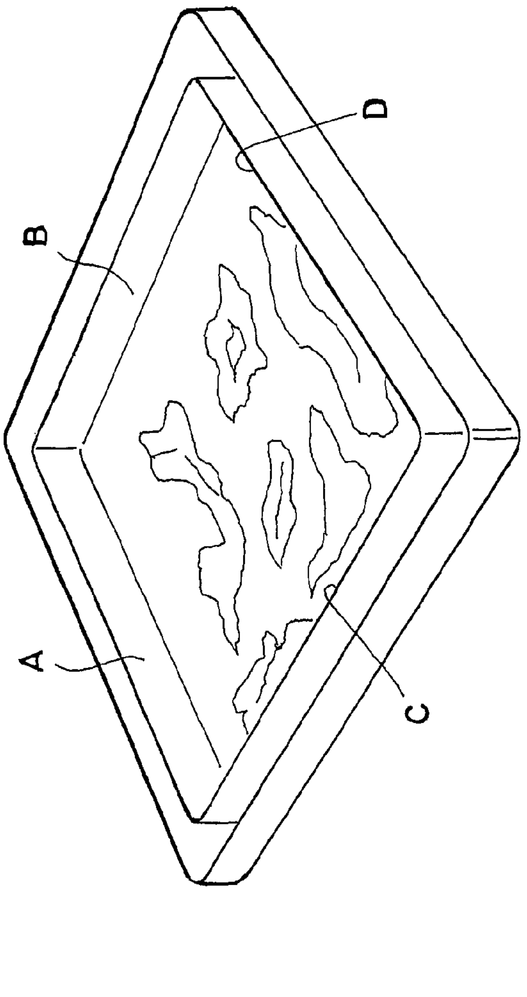
Fig.1 PRIOR ART
FIG. 1 is a perspective view of a rubber mould made according to the prior art.
Figure 4:
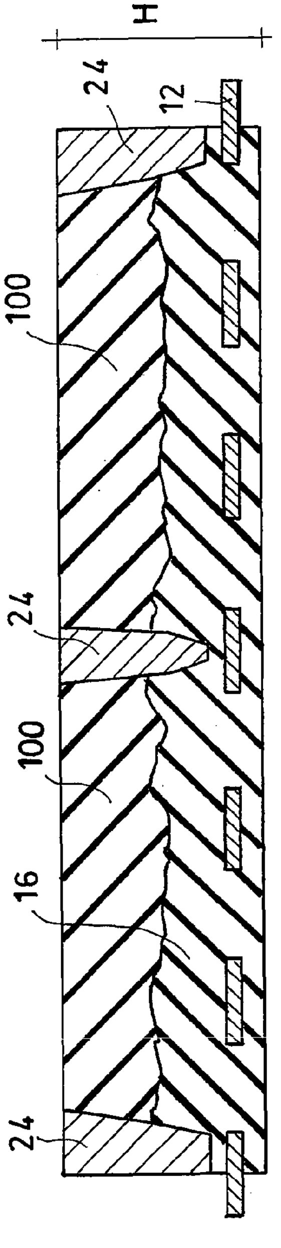
FIG. 4 is a section view of a mould for building coating products according to the present invention, shown in a first operative configuration.

With reference in particular to figures from 4 to 11, a mould for building coating products according to the present invention is shown, wholly indicated with reference numeral 10. The mould 10 is of the "with reverse demoulding" type and it consists of three separate components, described in the rest of the description. The three components of the mould 10 are interconnected with one another so as to allow the production of the coating products for construction, typically but not necessarily consisting of slabs of artificial stone 100, avoiding the drawbacks in terms of production and cost that have been previously described.

In detail, in a preferred embodiment thereof, the mould 10 is made up of:

- a base plate 12, which is manufactured from a rigid indeformable material and is provided with a plurality of through holes 14;
- a die 16, which is manufactured from a resilient and deformable material and is configured for incorporating the base plate 12 therein, the die 16 being provided with the shape in negative of the front surface of each coating product 100 to be manufactured; and
- a moulding grid 18 that is open at the upper part, manufactured from a rigid indeformable material and that is configured to be pressure applied above the die 16, so as to define the perimeter edges of each coating product 100 to be manufactured.

The die 16 is made in an artificially stable and indeformable form in the configuration of the mould 10 in which the base plate 12 is incorporated inside the die 16 itself. In addition, in the configuration of the mould 10 in which the base plate 12 is incorporated inside the die 16, such a base plate 12 and such a die form a first half of the mould 10, which can be separated with respect to the second half of the mould that is made up of the moulding grid 18. It is possible to obtain a coupling that is stable and is without loss between the two halves of the mould 10 thanks to the deformability (only locally) of the die 16 when the moulding grid 18 is positioned on such a die 16 to form the mould 10.

The base plate 12 is preferably manufactured from a metal material with a suitable thickness, typically steel, so that the planarity of the base plate 12 itself is ensured. The base plate 12 is manufactured from any dimensions whatsoever, as long as they are compatible with the manual operations and with the manufacturing plant of the coating product 100.

The through holes 14 can be of any shape and/or size. Preferably, such through holes 14 are circular shaped and are uniformly distributed along the entire flat surface of the base plate 12.

The die 16 is preferably manufactured from a polyurethane rubber and the base plate 12 is incorporated inside it, so that the base plate 12 projects from the die 16 at two opposite lateral edges. The opposite projecting portions of the base plate 12 are used for being able to transport the mould 10 with special conveyor belts. The die 16 is in turn configured to project uniformly beneath the base plate 12, whereas on its upper surface it has the shapes 20 with the exposed surface of the portions of stones 100 to be copied.

The die 16 is divided into a plurality of shapes 20 in negative each defining a single coating product 100. The division of the die 16 is obtained with a deep incision, called a "furrow". In other words, the upper surface of the die 16 is fragmented into single shapes 20, which are separated by suitable grooves or "furrows" 22 with a suitable width and length and so as to be able receive the side walls 24 of the moulding grid 18 therein, through light mechanical compression.

Figure 10:
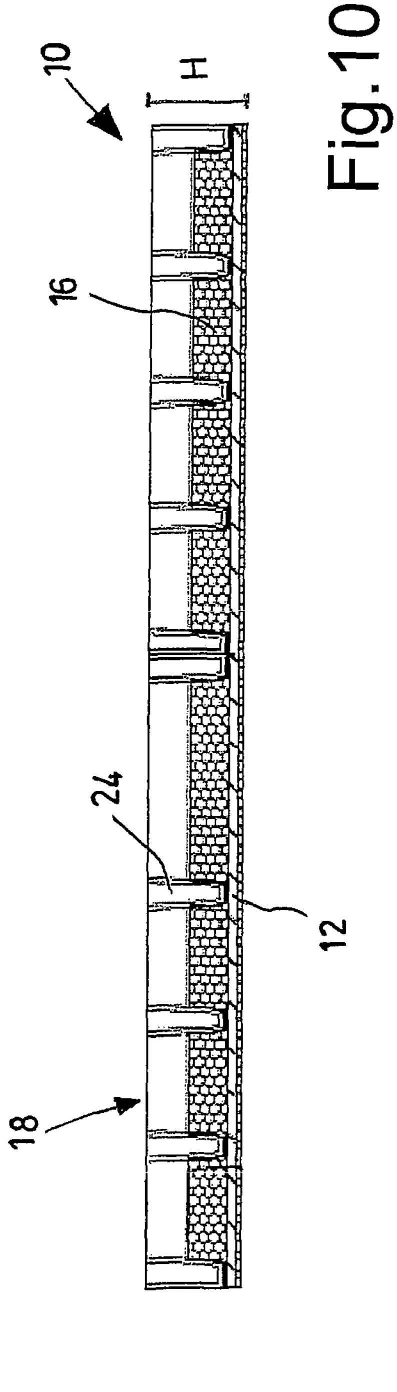
FIG. 10 is a section view, which is obtained along the line X-X of FIG. 9, of the mould for building coating products according to the present invention.
Figure 11:
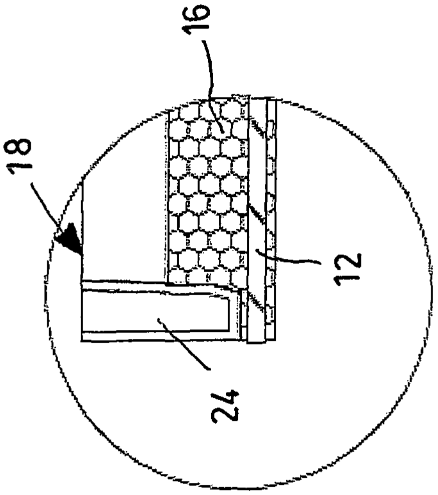
FIG. 11 is a detailed view of a detail of FIG. 10.

The moulding grid 18 can have any shape and dimensions, but each time corresponding to the shape and to the dimensions of the die 16 and, especially, of the grooves 22 obtained therein. The moulding grid 18 indeed engages inside the grooves 22 of the die 16 thanks to the shape itself of its skeleton, consisting of the side walls 24 (see for example the section view of FIG. 10). Indeed, it is easy to understand that the moulding grid 18, once it is positioned above the die 16 with the relative grooves 11, can perfectly engage above the shapes 20 representing the single coating products 100 to be manufactured.

Figure 9:
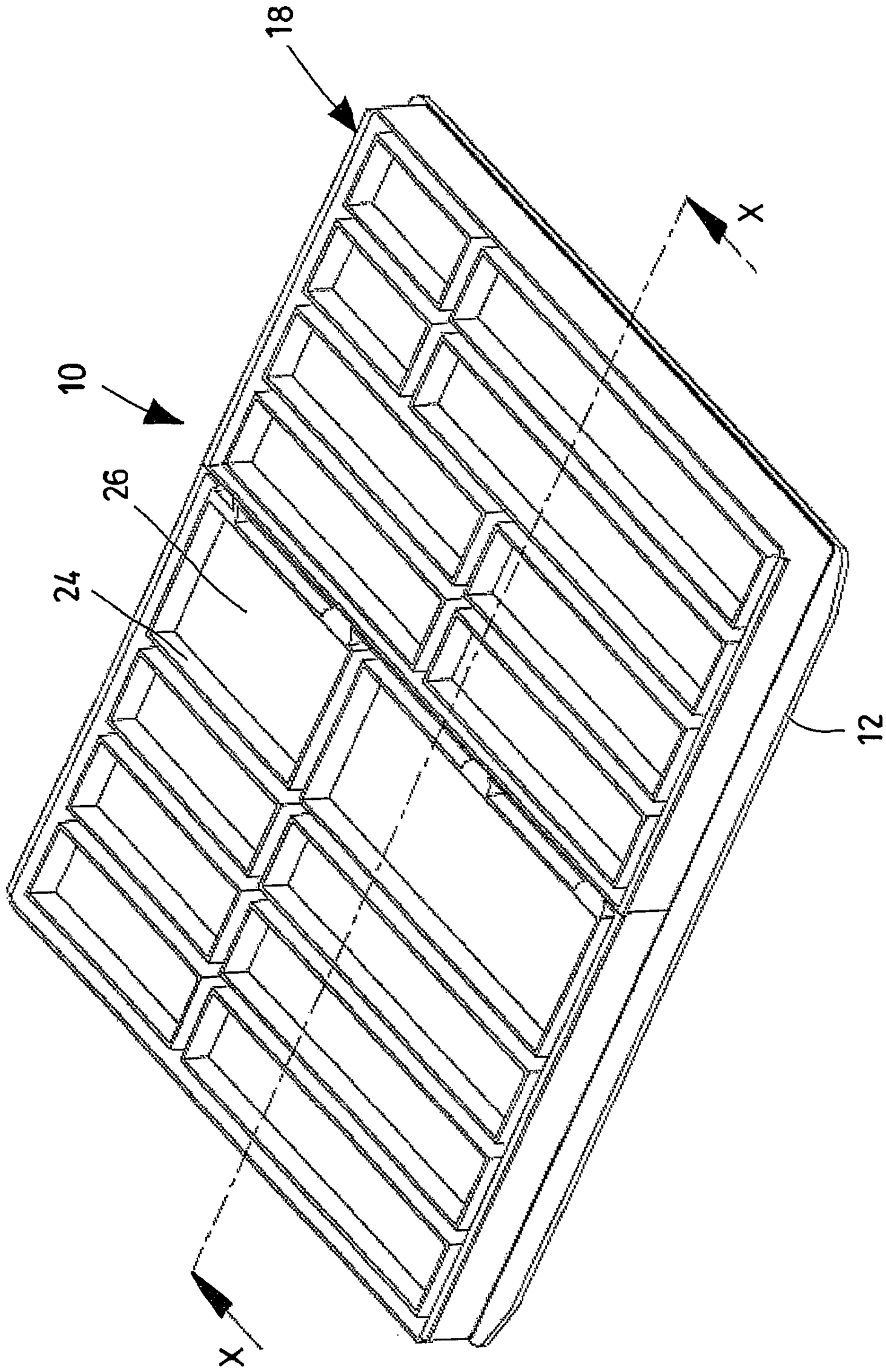
FIG. 9 is a perspective view of the mould for building coating products according to the present invention.

In particular it can be noted that, between the side walls 24 of the moulding grid 18, separate bowls are formed that are perfectly sealed (FIG. 9), with the "exposed face" below it. Each bowl 26, thanks to the reverse demoulding angle $\alpha$ with which the single side walls 24 are inclined with respect to a vertical plane, has a lower surface with dimensions that are greater with respect to its corresponding upper surface. In addition, thanks to the deformability of the resilient material with which the die 16 is manufactured, the bottom of each bowl is perfectly sealed.

The reverse demoulding angle $\alpha$ is preferably comprised between 1° and 4° with respect to a vertical plane (more preferably between 2° and 2.5°) as a function of the thickness and of the type of artificial stone that constitutes the coating products 100. In other words, by effect of the reverse demoulding angle $\alpha$, each side wall 24 of the moulding grid 18 has a sharp-pointed and tapered shape from top towards bottom with respect to the entire mould 10, which facilitates the extraction of the finished products 100 from the mould 10.

The components 12 (base plate), 16 (die) and 18 (moulding grid) previously described are coupled with one another so as to form the mould 10 so that this always has the same predetermined height H, or a height H that can vary according to the type of product 100. The mould 10, or more moulds 10 the same as one another, can be used for the manual or automated production of artificial stones 100 for coatings.

The manufacturing steps of one or more coating products 100 using a mould 10 of the type described so far, both for manual processes, and for automatic processes, can be illustrated as follows.

The mould 10, after its components 12 (base plate), (die) and 18 (moulding grid) have been cleaned in order to remove possible cement residues, is assembled by joining such components 12 (base plate), 16 (die) and 18 (moulding grid) with one another, so as to obtain an assembly having a predefined height H. The exposed surfaces of the die 16 and of the side walls 24 of the moulding grid 18 are then covered with detachment oil, so as to facilitate the subsequent unmoulding of the coating products 100.

At this stage a cement mixture is poured into the separate bowls 26 after the bottom has been painted with the coloured cement grouting agents. The formulation of the cement mixture can vary according to the cases as a function of the type of artificial stone that is desired to be copied. Once the mixture has been poured, the mould 10 undergoes a vibrating step for eliminating any air bubbles, thus obtaining a compact product 100. It is important to note that, in processes of the known type, the liquid mortar is directly pressed or pressed-vibrated mechanically inside the formwork instead of foreseeing a preliminary pouring step.

Following the vibrating step, the mould 10 is set to rest for the aging time (which may or may not be accelerated) of the mixture, by using special chambers inside which there may or may not be a heat cycle for raising the temperature. The heat cycle for increasing the temperature can be carried out so as to obtain the hardening of the mixture over a short time in the case of accelerated aging.

Figure 5:
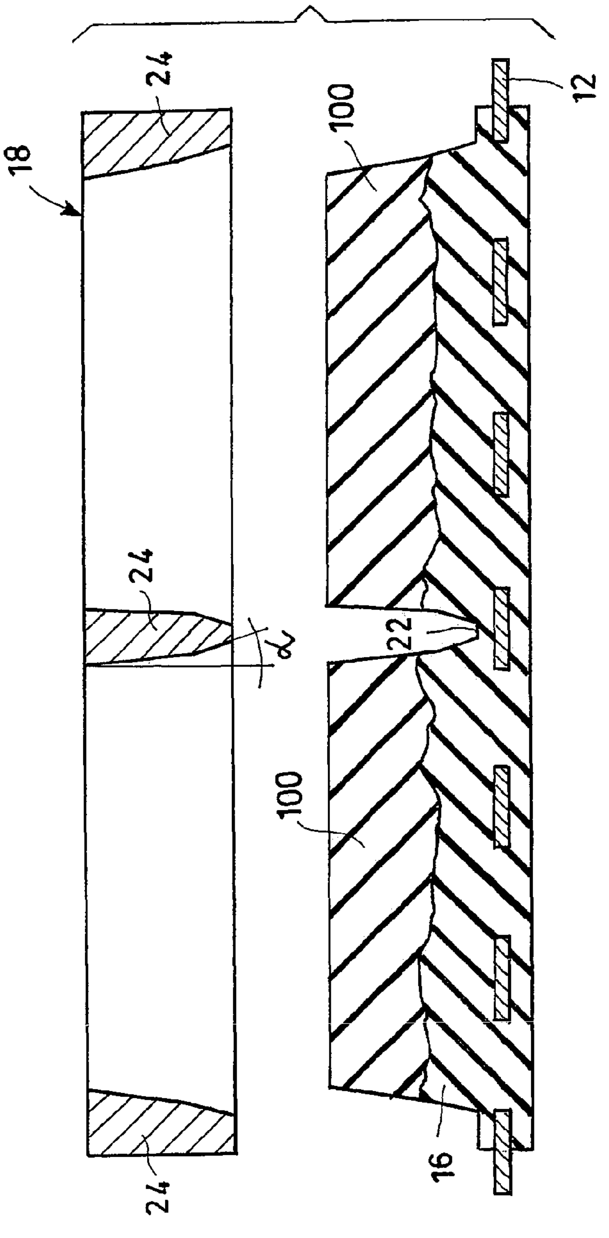
FIG. 5 is a section view of the mould of FIG. 4, shown in a second operative configuration.

Once the necessary resistance and the required degree of drying have been obtained, the products 100 are extracted from the mould 10, firstly separating the moulding grid 18 from the assembly consisting of the base plate 12 and of the die 16 (FIG. 5). The detachment of the moulding grid 18 from the assembly consisting of the base plate 12 and of the die 16, which still supports the products 100, can occur easily thanks to the reverse demoulding angle α present on the side walls 24 of the moulding grid 18 itself.

Figure 6:
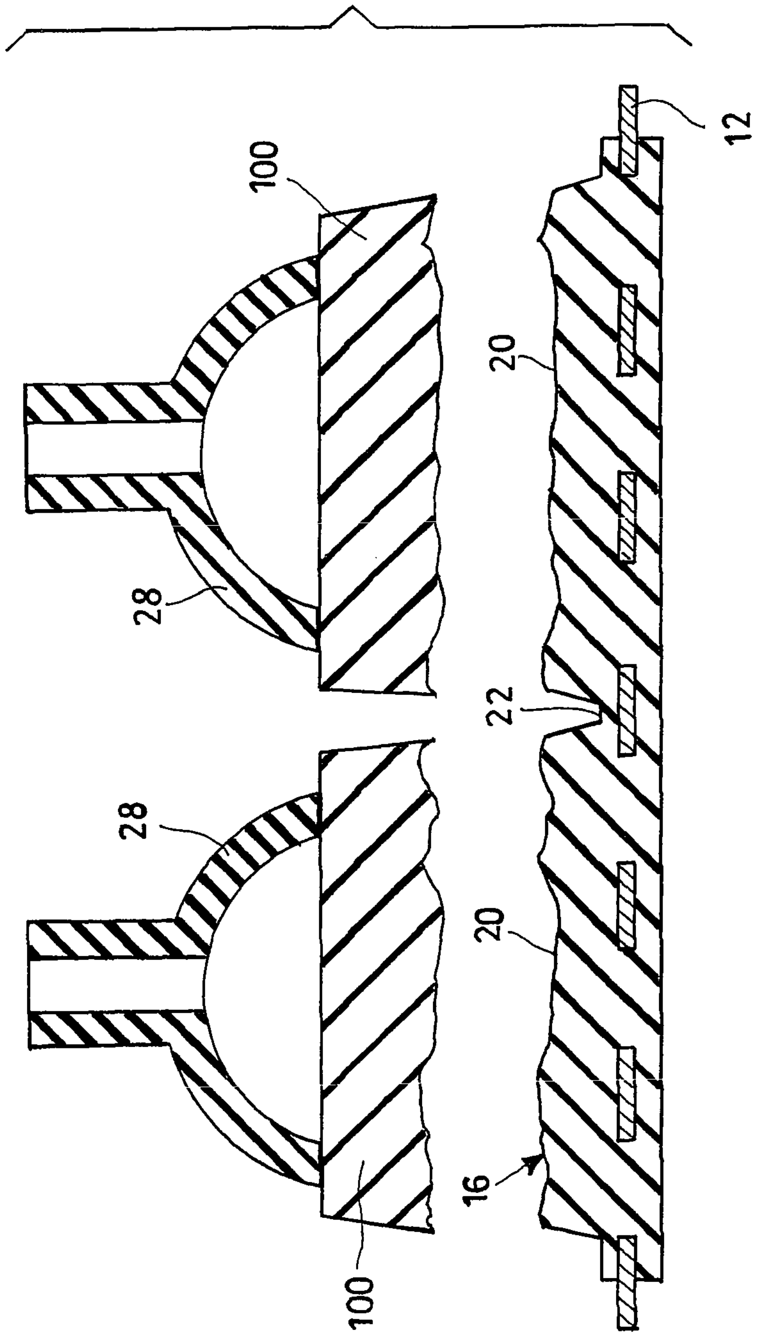
FIG. 6 is a section view of the mould of FIG. 4, shown in a third operative configuration.
Figure 7:
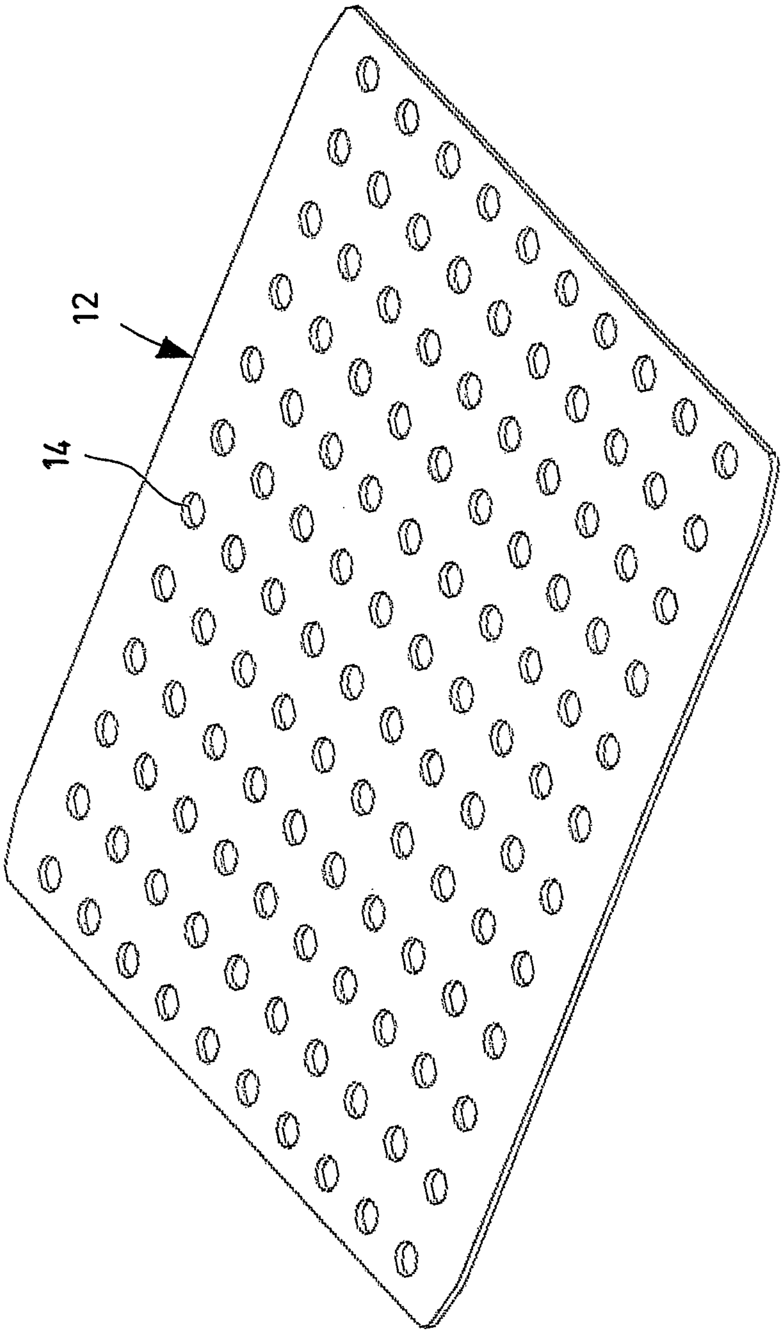
FIG. 7 is a perspective view of a first component of the mould for building coating products according to the present invention.
Figure 8:
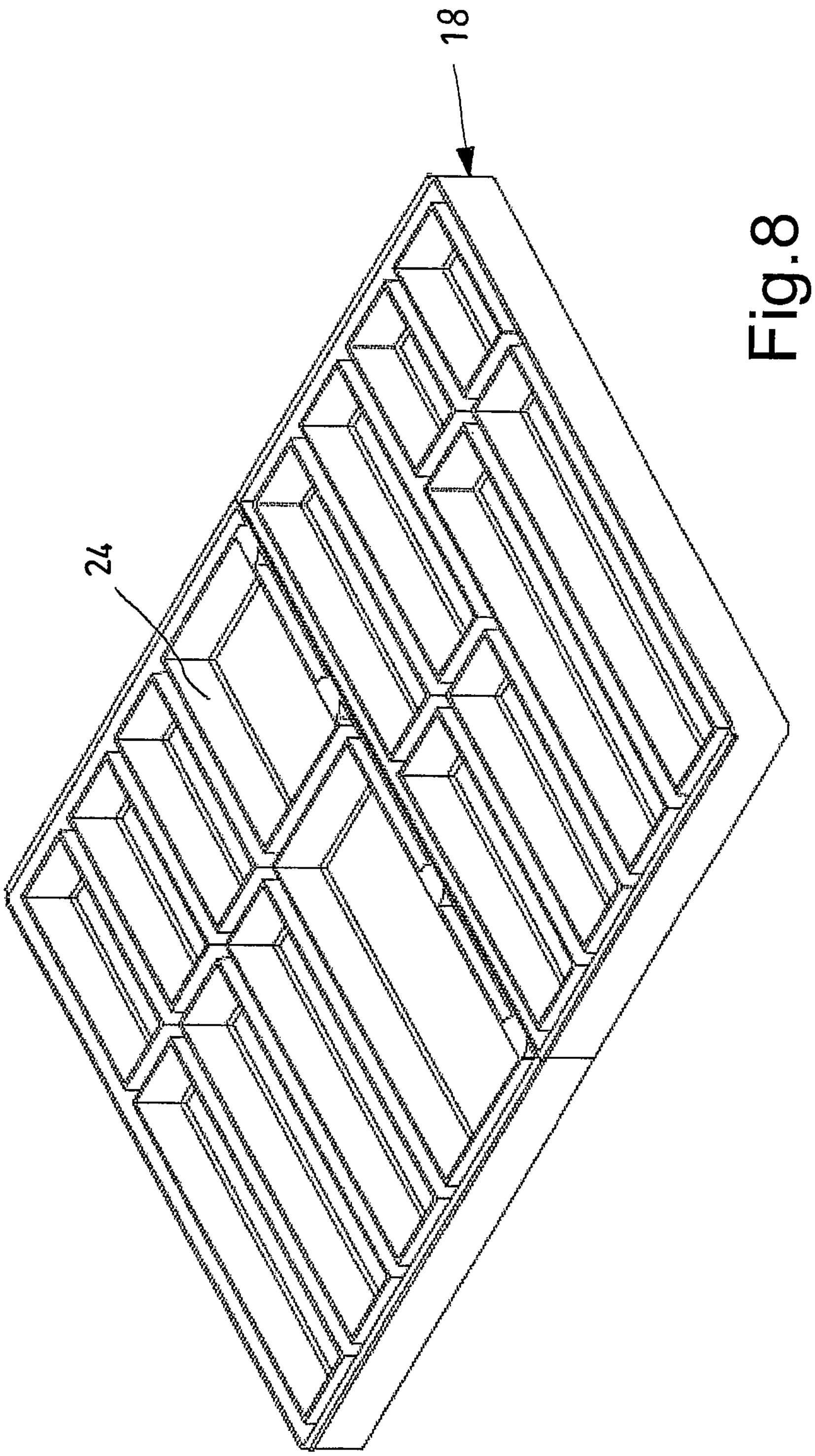
FIG. 8 is a perspective view of a second component of the mould for building coating products according to the present invention.

The extraction of the products 100 can be facilitated by subjecting the mould 10 to vibrating and it can also be carried out with mechanical unmoulding means, like for example vacuum cups 28 shown in FIG. 6. The products 100 that are extracted from the mould 10 can be subsequently packed and stored both manually, and automatically. The mould 10, divided into the two parts made up of the moulding grid 18 and of the assembly consisting of the base plate 12 and of the die 16, is at this stage recompacted and cleaned so as to be ready to cyclically produce new products 100.

The moulding grid 18 must be dealt with very carefully, since it is formed with a plastic material that has been perfectly smoothed so as to be practically non-adherent to the concrete liquid-based mixtures used for making the products 100. Such mixtures, once they are hardened, indeed, become detached from the walls of the moulding grid 18 in an easy manner both for the non-adherence characteristic, and for the presence of the reverse demoulding angle α present on all the side walls 24 of the moulding grid 18.

Figure 12:
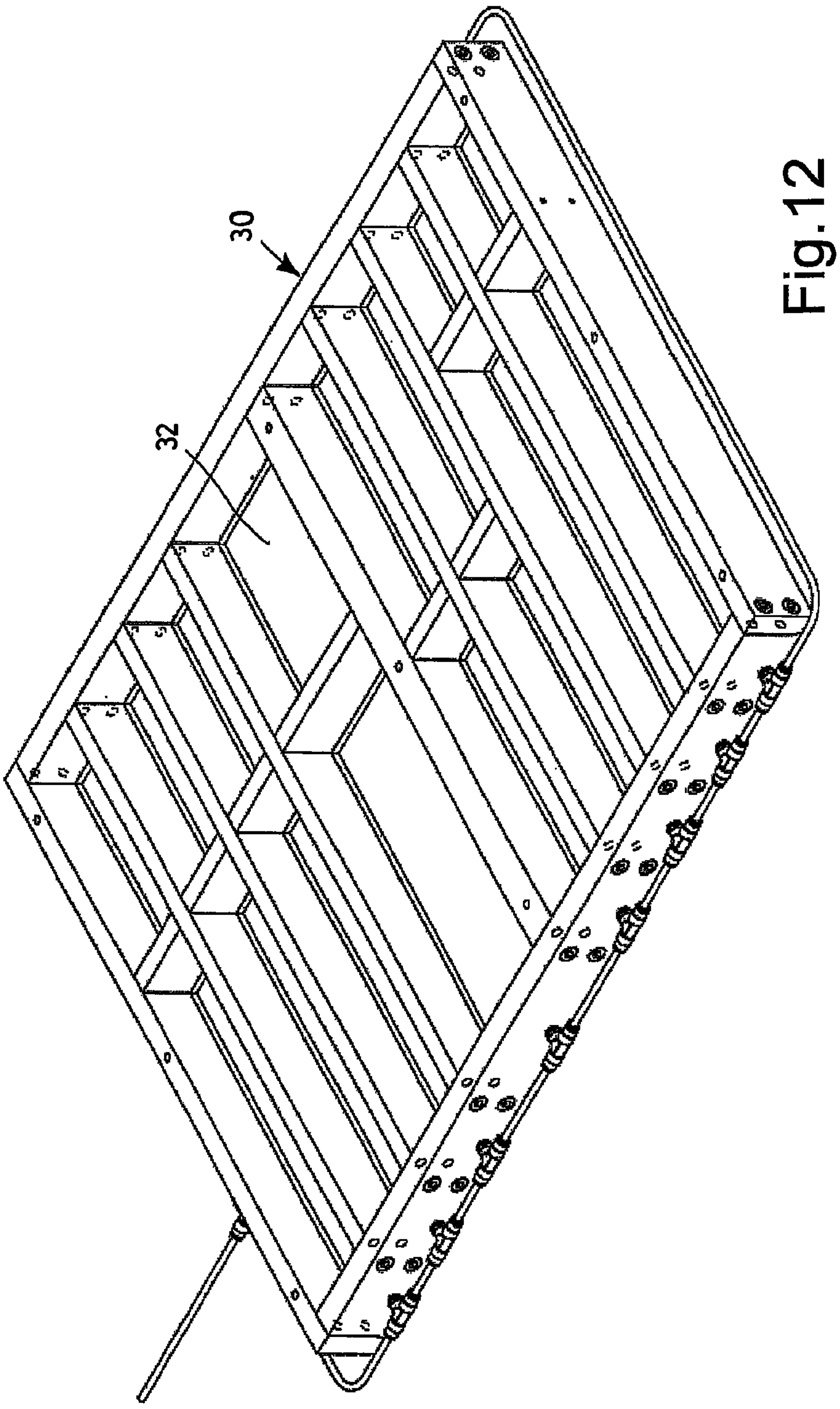
FIG. 12 is a perspective view of a tool for manufacturing a component of the mould for building coating products according to the present invention.

With reference now to FIG. 12, a tool 30 is shown for manufacturing the die 16 in resilient and deformable material having the purpose of copying in negative the exposed surface of the artificial stone 100. The tool 30 is produced in a limited number of samples with respect to the number of the moulds circulating in the plant for manufacturing the artificial stones 100.

The tool 30 is made up of a frame provided with bars made of acetal resin that are assembled by hand, fixed with a series of Allen screws for creating a grid made up of a plurality of positions with spaces 32 with various length and width. The various natural stones that make up the samples to be reproduced through the products 100 are positioned inside the spaces 32.

The natural stones are cut, shaped, positioned inside the corresponding spaces 32 and are fixed to the walls of the frame of the tool 30 through silicone. The natural stones therefore create the negative of the surfaces of the die 16 of the mould 10.

The walls of the tool 30 have an inclination of 0° with respect to a vertical plane and, at the top, they have a tapered portion with an acute angle, preferably of about 16°, again with respect to a vertical plane. Such an acute angle is present on both the sides of the inner walls of the tool 30 and only on the inner side of the peripheral walls. Along the outer perimeter of the tool 30 is provided a lip that is around 2 mm tall and around 5 mm wide.

The tool 30 is provided with a system for unmoulding the die 16 of the pneumatic type. This unmoulding system is made up of holes on the wall of the frame of the tool 30, one for each space 32, which allow pressurised air to enter. Moreover, the base of the frame is sealed with a cast of polyurethane rubber having a hardness of 70 degrees Shore, as well as a metal plate that is screwed to the base of the walls of the frame itself, so as to prevent the pressurised air to come out from the lower side of the tool 30. Indeed, therefore, the pressurised air pushes the die 16 in the opposite direction with respect to that of the casting, so as to facilitate the unmoulding.

The polyurethane rubber used for the production of the dies 16 can belong to different hardness classes, like for example 40, 55 and 70 degrees Shore. Some tests have also made it possible to evaluate the possible insertion of a filler so as to reduce the amount, and consequently the costs, of the polyurethane resin. In this case the preparation is made by adding Poraver® 0.5-1.0 mm. From the unmoulding tests it was found that the compressed air system operates well with rubber of 40 degrees Shore, and with rubber of 55 degrees Shore, both added with a special filler.

One typical preferred embodiment of the mixture that is suitable for producing each single die 16 foresees an amount of polyurethane resin equal to 5 Kg, to which 300 g of Poraver® are added. Once the resin and the filler have been introduced inside a container, they are mixed with an air drill that is provided with a beater. 125 g of hardening agent are subsequently added for every kilogram of resin and then everything is mixed for around 30 seconds so as to distribute it uniformly. At this stage the mixture is ready to be cast. The casting must occur in the shortest time possible and according to the time of workability allowed based upon the technical specifications of the product.

Before preparing the rubber cast, the perforated base plate 12, which forms the base of the mould 10 and its supporting structure, is rested and centred on the tool 30. The base plate 12 actually acts as a skeleton for supporting the relative die 16, which otherwise could not be supported.

The base plate 12 is provided with through holes 14 so as to allow the rubber to be cast and allow it to pass in all the gaps. The base plate 12 rests on the lip present on the outer perimeter of the tool 30, thus being lifted by 2 mm with respect to the other walls and thus allowing the resin to pass between one space and the other and completely fill the tool 30 itself. In order to prevent the resin from coming out from the tool 30, passing through the slit between the lip and the base plate 12, it is foreseen for there to be a gasket that ensures it is sealed.

Since the base plate 12 must be a single piece with the die 16, acting as a skeleton as previously described, the resin must coat it and create a layer of around 2 mm of thickness above the base plate 12 itself. For such a purpose a rectangular metal containing structure was created, equipped with a gasket on the lower base so as to ensure the seal, which is rested and centred above the base plate 12.

Both on the surface of the air inlet holes, and on the inner edge of the containing structure a thin layer of fat is spread that, in the first case, prevents the holes from being obstructed by the resin and, in the second case, prevents the rubber from solidifying and welding onto the gasket. In such a way the gasket itself can be used for producing more than one die 16. At this stage it is possible to prepare the polyurethane mixture and pour it in the tool 30, thus obtaining the assembly consisting of the base plate 12 and of the die 16 of the mould 10.

The rubber, in standard environment, is left to rest for about one day and, once it is solidified, the assembly, consisting of the base plate 12 and of the die 16, can be unmoulded. The unmoulding consists of inserting pressurised air inside the unmoulding system of the tool 30. The air creates a cushion inside the spaces 32 of the tool 30, between the stones and the rubber, and lifts the die 16 by around 15/20 mm. At this stage the operator can extract the assembly consisting of the base plate 12 and of the die 16 from the tool 30, without difficulty.

By adding the moulding grid 18 to the assembly consisting of the base plate 12 and of the die 16 the complete mould 10 is obtained, empty and ready for casting. As previously described, the coupling between the moulding grid 18 and the assembly consisting of the base plate 12 and of the die 16 occurs by engagingly inserting the moulding grid 18 itself inside the grooves 22 of the die 16.

Figure 13:
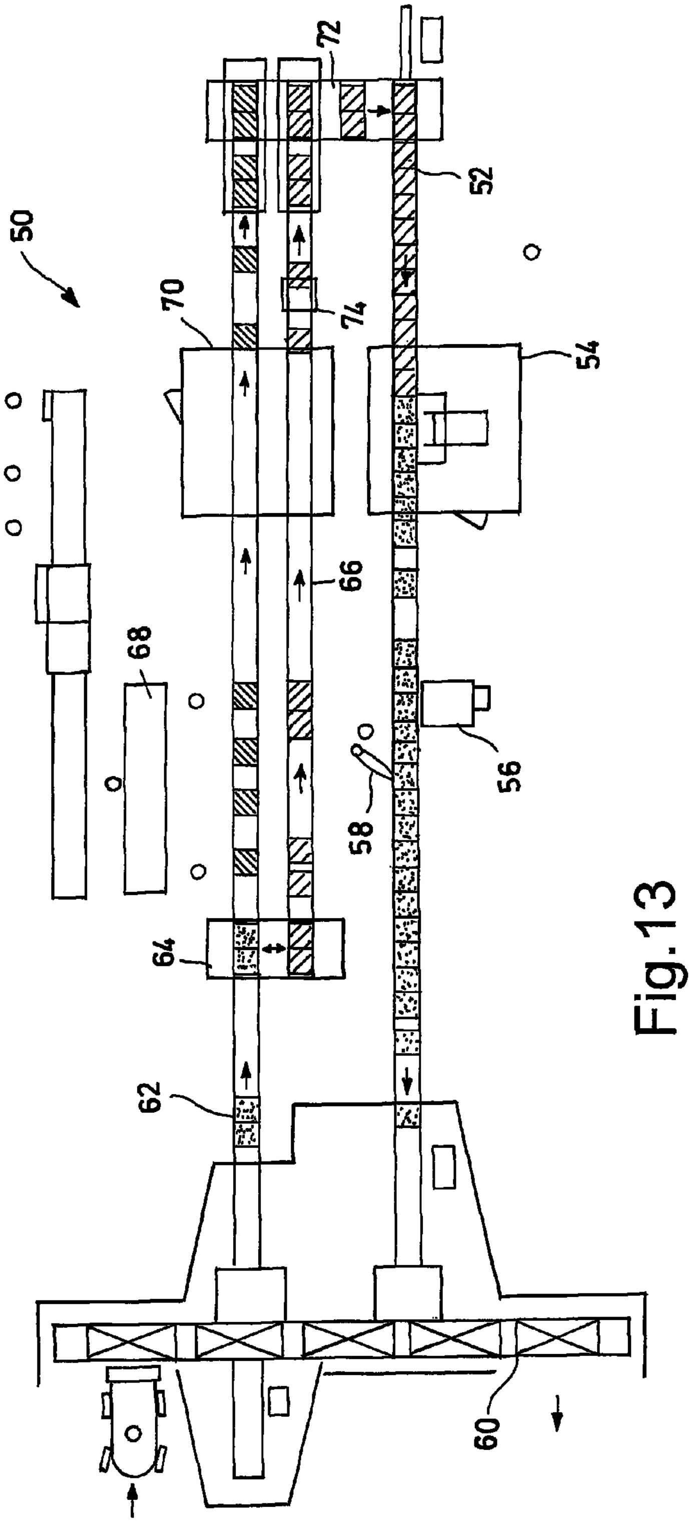
FIG. 13 is a plan view from above of a plant for manufacturing coating products for construction according to the present invention.

With reference now to FIG. 13, this shows a plant for manufacturing the coating products 100. The plant 50 firstly comprises a first conveyor belt 52 that is capable of handling the moulds 10, initially empty and then filled with the products 100 to be formed.

The plant 50 also comprises a painting station 54 for the moulds 10. The painting station 54 is made up of a series of Venturi nozzle sprayers that oscillate around a horizontal axis that is perpendicular with respect to the direction of the conveyor belt 52, so as to apply a layer of even paint on every part of the moulds 10 where the mixture constituting the products 100 will be cast.

The mixture for manufacturing artificial stones 100 is prepared separately and it is positioned inside a dosing machine 56. The dosing machine 56 pours the mixture into the moulds 10 through a rotary distributor device that is provided with paddles, having an action surface that is equal to the overall surface of the moulds 10 themselves.

The rotary distributor device has the function of distributing the material into the moulds 10 which pass below the dosing machine 56. The conveyor belt 52, at the dosing machine 56, is provided with vibrating elements that help the distribution of the material inside the moulds 10. Subsequently, a levelling machine 58 of the rotary type, that is arranged downstream of the dosing machine 56 and having a greater action surface than the overall surface of the moulds 10, makes the distribution of the mixture into the moulds 10 even and removes any excess material from the top of the moulds 10 themselves.

At this stage the moulds 10, filled with the material that is still fluid, are sent to a collection device 60 from which they are taken and positioned in an aging chamber to dry. The collection device 60, that is typically made up from a stacker/destacker device, is made up of a stacker that stacks the moulds 10, vertically and in groups of predefined units, inside a cage with a plurality of columns. Once one column has been filled, the stacker makes the cage slide to the following column. Once all the columns have been filled, the entire cage is pushed towards the extraction area, where a forklift takes it and transports it to the aging chamber.

Once the products 100 inside the moulds are aged, the cage is taken from the aging chamber and is inserted in the inlet area of the destacker device, where an extractor device extracts the moulds 10 one at a time, thus depositing them on a second conveyor belt 62 following the opposite sequence with respect to the placing step. The cages operate so that, while one cage is extracted, from the opposite side of the collection device 60 another cage is inserted ("first-in last-out" procedure).

The second conveyor belt 62 then transports the moulds 10, filled with artificial stones 100 that have already been dried, towards the unmoulding step. The unmoulding machine 64 comprises a first shaped clamp that grips the moulds 10 from the lateral edge thereof and lifts them, whereas a second shaped clamp goes to push the stones 100 downwards, detaching the die 16 with the stones 100 still resting on it (see FIG. 5) from the moulding grid 18.

At this stage the dies 16 with the stones 100 continue to slide along the second conveyor belt 62, whereas the moulding grids 18 are transferred onto a third conveyor belt 66, which is separated and parallel with respect to such a second conveyor belt 62. The stones 100 are manually taken from the dies 16 by operators who position them on a shelf 68, from which they are then grouped and packed. Subsequently, both the empty dies 16, and the moulding grids 18 continue to slide on the respective conveyor belts 62 and 66 towards a cleaning station 70, which indeed cleans such components 16 and 18 of the mould 10.

The dies 16 and the clean moulding grids 18 are sent to a mounting station 72, where each mould 10 is reconstructed. Before reaching such a mounting station 72, the moulding grids 18 pass through a spraying device 74, which applies a layer of oil so as to facilitate the introduction into the dies 16 of the moulding grids 18 themselves.

In the mounting station 72 the dies 16 are pushed by a piston inside the guides of a coupling belt. The moulding grids 18 are, on the other hand, taken with a clamp, which then goes to position them above the respective dies 16 by applying considerable pressure so as to promote a good coupling. At this stage the complete moulds 10 are pushed by a piston onto the first conveyor belt 52, so that they can restart a new painting and casting step of the material to be dried.

In the plant 50 described thus far the steps of taking the artificial stones 10 from the moulds and their subsequent packing for shipping are carried out manually. It is however possible to foresee automated devices that are also capable of carrying out these activities.

It has thus been seen that the mould for building coating products and the plant for manufacturing such coating products according to the present invention achieve the purposes that were previously highlighted. The mould according to the present invention is immune to permanent deformation and wearing, due to the fact that it is completely rigid/planar, whereas the negative surface that copies the natural stone constitutes the bottom on which the liquid mortar contained inside the various compartments obtained in the grid, which is fitted above the die, is poured. The poured mortar never undergoes compacting due to pressure and there is no problem of dosing the material, like occurs, on the other hand, in the mould described in document WO 2010/069057 A1: only a slight vibration is applied to the whole mould to make possible air bubbles present in the liquid mortar come to the surface.

Each mould accompanies the product in the aging cycle up to the complete hardening of the product itself. Only subsequently the mould is opened in its two halves thanks to the unmoulding angles with an inclination of the sides that is opposite with respect to the flexible formworks according to the prior art. Therefore, the product is extracted in a very simple manner, since it is only rested on its "noble face", and subsequently the two parts of the mould are cleaned, oiled and joined again so as to repeat the production cycle.

The upper part of the mould, consisting of the moulding grid, engages inside the grooves with a perfect seal, whereas the lower part of the mould itself, despite being mainly manufactured from a resilient and deformable material, is rigidly planar thanks to the introduction of the perforated steel slab, carrying the "noble faces" at the top spaced from one another with the grooves for fixing or coupling the moulding grid.

The mould and the relative plant make it possible to produce plates that can be coupled in a very precise manner, by reducing to the minimum the furrow between one stone and the contiguous one and by eliminating the drawbacks related to colouring, width, finishing, etc. relative to the material with which the furrow is filled. Indeed it is clear that a wall that is coated with natural stones that fit together very well has an appearance that is much nicer with respect to a wall of the same type, but having evident furrows.

The mould for building coating products and the plant for manufacturing such coating products of the present invention thus conceived can in any case undergo numerous modifications and variants, all covered by the same inventive concept; moreover, all the details can be replaced by technically equivalent elements. In practice the materials used, as well as the shapes and dimensions, can be any according to the technical requirements.

The scope of protection of the invention is thus defined by the attached claims.

The invention claimed is:

1. A mold for building coating products obtained from composite liquid mixtures, the mold comprising:

a base plate, manufactured from a rigid indeformable material and provided with a plurality of through holes;

a die, manufactured from a resilient and deformable material and configured for incorporating the base plate therein, on an upper surface of said die being obtained a plurality of shapes of a front surface in negative of each coating product to be manufactured; and a molding grid open at an upper part, manufactured from an indeformable rigid material and configured to be pressure applied above the die, the molding grid being provided with a plurality of side walls which define perimeter edges of each coating product to be manufactured;

wherein the die keeps a stable and indeformable shape when the base plate is incorporated inside said die, to form an assembly said assembly, forming a first half of the mold; which can be separated with respect to the second half of the mold made up of the molding grid, wherein between the side walls of the molding grid, separate bowls are formed for containing a single coating product; and wherein each side wall is inclined according to an acute angle ($\alpha$) with respect to a vertical plane, so as to confer to each side wall a sharp-pointed and tapered shape from top towards bottom with respect to the entire mold for facilitating extraction, of the finished coating products from said mold.

2. Mold according to claim 1, wherein said base plate is completely flat and formed from a metal material to provide a support structure.

3. Mold according to claim 2, wherein the through holes of the base plate are circular shaped and are uniformly distributed along the entire flat surface of said base plate.

4. Mold according to any claim 1, said die incorporates the base plate therein and said base plate projects from said die at two opposite lateral edges; and wherein said die is manufactured from a polyurethane rubber.

5. Mold according to claim 4, the shapes of the die are separated by corresponding grooves or "furrows" having width and length so as to be able to receive the side walls of the molding grid therein, through engagement.

6. The method for manufacturing building coating products starting from composite liquid mixtures with a mold according to claim 1, the method comprising the steps of:

mounting of said assembly consisting of said base plate and said die, and the molding grid, so as to obtain a mold having a predefined height (H);

pouring a liquid cement mixture into the separate bowls of the mold;

vibrating the mold to eliminate any air bubble to obtain a compact product;

separating the molding grid from the assembly consisting of the base plate and the die once the coating products have reached the required degree of drying, so as to facilitate the extraction of said coating products from the mold;

separating the dried coating products from the assembly consisting of the base plate and the die; and recomposing the mold through the mounting of the molding grid on the assembly consisting of the base plate and the die.

7. The method according to claim 6, wherein before the step of pouring the cement mixture into the separate bowls of the mold, a step of applying a detachment oil on the exposed surfaces of the die and said plurality of side walls of said molding grid to facilitate, the subsequent unmolding of the coating products.

8. The method according to claim 6, wherein before the mounting step, a preliminary step of cleaning said assembly consisting of said base plate and said die and said molding grid to remove cement residues.

9. The method according to claim 6, wherein subsequently to the mounting step, a step of applying a uniform layer of paint on every part of the mold where the cement mixture shall be introduced.

10. The plant for manufacturing building coating products starting from composite liquid mixtures using a mold according to claim 1, comprising:

a first conveyor belt, capable of handling the molds initially empty and then filled with the products to be formed;

dosing machine, capable of preparing the mixture for manufacturing the coating products and of pouring said mixture into the molds through a distributor device;

a levelling machine, arranged downstream of the dosing machine, capable of uniforming the distribution of the mixture into the molds and of removing any excess material from the top part of said molds;

a collection device, from which there are collected the mold with the coating products to be dried and on which are subsequently repositioned the molds with the dried coating products;

an extractor device, which extracts the mold from the collection device and thus deposits them on a second conveyor belt;

an unmoulding machine, capable of separating the molding grid from the assembly consisting of the base plate and the die; and a separation station for separating dried coating products from the assembly consisting of the base plate and the die.

11. The plant according to claim 10, wherein a painting station is positioned upstream of said dosing machine.

12. The plant according to claim 10, further comprising a third conveyor belt, separated and parallel with respect to the second conveyor belt, capable of handling the molding grids downstream of the unmoulding machine.

13. The plant according to claim 12, wherein a cleaning station downstream of said separation station for cleaning each mold;

wherein each mold includes said molding grid and said assembly consisting of said base plate and said die.

14. The plant according to claim 10, wherein a mounting station is positioned upstream of said first conveyor belt and downstream of said separation station, which is where each mold is assembled.

15. The plant according to claim 14, wherein a spraying device positioned upstream of said mounting station to apply a layer of oil on the molding grids to facilitate the introduction of said molding grids into the dies.

16. The plant according to claim 10, wherein the unmolding machine comprises a first shaped clamp, capable of grasping the molds from the lateral edge thereof and of lifting them, and a second shaped clamp, which pushes the dried coating products downwards, detaching the die from the molding grid with said coating products still placed thereon.

* * * * *